No. 776,868. PATENTED DEC. 6, 1904.
D. SHEFFIELD.
CLOTHES HANGER.
APPLICATION FILED JUNE 23, 1904.
NO MODEL.
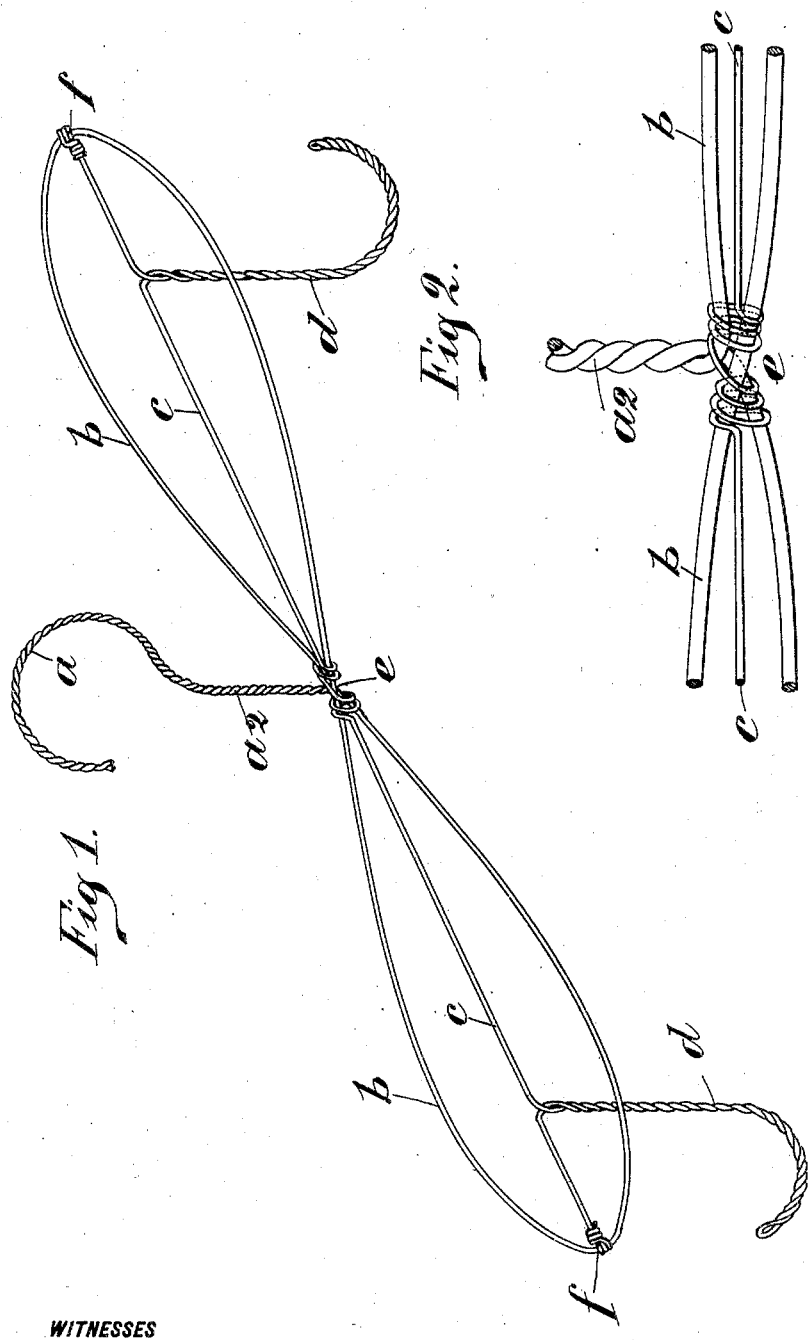
WITNESSES
O. P. Williams
J. A. Stewart
INVENTOR
Dora Sheffield
BY Edgar Tate & Co
ATTORNEYS No. 776,868. Patented December 6, 1904.

UNITED STATES PATENT OFFICE.

DORA SHEFFIELD, OF NEW YORK, N. Y.

CLOTHES-HANGER.

SPECIFICATION forming part of Letters Patent No. 776,868, dated December 6, 1904.

Application filed June 23, 1904. Serial No. 213,770. (No model.)

*To all whom it may concern:*

Be it known that I, DORA SHEFFIELD, a citizen of the United States, residing at New York, in the county of New York and State of New York, have invented certain new and useful Improvements in Clothes-Hangers, of which the following is a specification, such as will enable those skilled in the art to which it appertains to make and use the same.

This invention relates to clothes-hangers; and the object thereof is to provide an improved device of this class which is designed for use in supporting or suspending ladies' garments, a further object being to provide a device of this class by which both a coat or cloak and a skirt may be conveniently suspended; and with these and other objects in view the invention consists in a device of the class specified, constructed as hereinafter described and claimed.

The invention is fully disclosed in the following specification, of which the accompanying drawings form a part, in which the separate parts of my improvement are designated by suitable reference characters in each of the views, and in which—

Figure 1 is a perspective view of my improved clothes-hanger or garment-suspending device, and Fig. 2 an enlarged perspective view of the central portion thereof.

In the practice of my invention I provide a device of the class specified comprising a central hook $a$, having a depending shank member $a^2$, with which is connected two side arms $b$, which extend in opposite directions and which are made in the form of loops, and each of which is provided with a central longitudinal member $c$, provided at a predetermined point intermediate of the outer ends of said arms and the inner ends thereof with a depending hook $d$, the hook portion of which extends outwardly and opens upwardly.

In practice a coat or cloak or other garment is hung upon or suspended from the arms $b$ in the usual manner, while the depending hooks $d$ are intended to support a skirt, this operation being accomplished by connecting the ends of the waistband and hanging the waistband portion over the hooks $d$, and the hooks $d$ may be arranged at any desired point between the outer ends of the arms $b$ and the central hook member $a$.

In constructing this device the arms $b$ or the loop-shaped portions thereof are preferably formed from a single wire bent to form said loop-shaped portions $b$, and the ends of which are then brought together at $e$ and twisted together to form the hook $a$ and the shank $a^2$ thereof. Another wire is then selected and the central portion thereof wrapped or folded around the inner ends of the loop-shaped portions of the arms $b$ and around the shank $a^2$ of the hook $a$, as clearly shown at $e$, and the end portions of said wire are then extended outwardly and formed into the hooks $d$, after which the extreme ends of said wires are connected with the ends of the loop-shaped portions of the arms $b$, as shown at $f$.

It will be understood that the wires from which this device is formed may be of any desired size and strength; but in practice the parts $c$ may be formed from smaller wires than the other parts, if desired, and as clearly shown in Fig. 2.

In the drawings forming part of this specification the arms $b$ extend in a substantially horizontal position; but said arms may be curved downwardly in the usual manner, if desired, and my invention is not limited to the exact construction of my improved clothes hanger or suspender as herein shown and described, but I prefer such construction and that the various parts be made of strong spring-wire; but various changes therein and modifications thereof may be made without departing from the spirit of my invention or sacrificing its advantages.

Having fully described my invention, what I claim as new, and desire to secure by Letters Patent, is—

A clothes hanger or suspender, comprising a central hook member having a depending shank, and laterally-directed loop-shaped arms connected with said shank, said loop-shaped arms being provided with a central longitudinal member provided at points between the outer and inner ends thereof with depending hook members, substantially as shown and described.

In testimony that I claim the foregoing as my invention I have signed my name, in presence of the subscribing witnesses, this 20th day of June, 1904.

DORA SHEFFIELD.

Witnesses:
F. A. STEWART,
C. E. MULREANY.